(12) United States Patent
Sneyders et al.

(10) Patent No.: US 10,552,743 B2
(45) Date of Patent: *Feb. 4, 2020

(54) RECURSIVE ADAPTIVE INTERACTION MANAGEMENT SYSTEM

(71) Applicant: Genesys Telecommunications Laboratories, Inc., Daly City, CA (US)

(72) Inventors: Dave Sneyders, Schoten (BE); Brian Galvin, Seabeck, WA (US); S. Michael Perlmutter, San Francisco, CA (US)

(*) Notice: Subject to any disclaimer, the term of this patent is extended or adjusted under 35 U.S.C. 154(b) by 252 days.

This patent is subject to a terminal disclaimer.

(21) Appl. No.: 15/197,645

(22) Filed: Jun. 29, 2016

(65) Prior Publication Data

US 2016/0314396 A1    Oct. 27, 2016

Related U.S. Application Data

(63) Continuation of application No. 14/810,421, filed on Jul. 27, 2015, now Pat. No. 9,384,446, which is a
(Continued)

(51) Int. Cl.
| | | |
|---|---|---|
| *H04M 3/00* | (2006.01) | |
| *G06N 5/02* | (2006.01) | |
| *G10L 17/22* | (2013.01) | |
| *H04M 3/51* | (2006.01) | |
| *G10L 15/26* | (2006.01) | |
| *G10L 25/72* | (2013.01) | |

(52) U.S. Cl.
CPC .............. *G06N 5/025* (2013.01); *G10L 15/26* (2013.01); *G10L 17/22* (2013.01); *G10L 25/72* (2013.01); *H04M 3/5133* (2013.01); *H04M 3/5141* (2013.01); *H04M 3/5166* (2013.01); *H04M 3/5183* (2013.01); *H04M 2203/357* (2013.01)

(58) Field of Classification Search
CPC .................................................. H04M 3/5166
USPC .................................................... 379/266.07
See application file for complete search history.

(56) References Cited

U.S. PATENT DOCUMENTS

| | | |
|---|---|---|
| 5,499,289 A | 3/1996 | Bruno et al. |
| 6,170,011 B1 | 1/2001 | Macleod Beck et al. |
| | (Continued) | |

FOREIGN PATENT DOCUMENTS

| | | |
|---|---|---|
| EP | 1191772 A2 | 3/2002 |
| EP | 1418741 A2 | 5/2004 |
| | (Continued) | |

OTHER PUBLICATIONS

Chinese Office action for Patent Application No. 200880123030.4, dated Jul. 7, 2014, 12 pages.
(Continued)

*Primary Examiner* — Shaun Roberts (57) ABSTRACT

A management system for guiding an agent in a media-specific dialogue has a conversion engine for instantiating ongoing dialogue as machine-readable text, if the dialogue is in voice media, a context analysis engine for determining facts from the text, a rules engine for asserting rules based on fact input, and a presentation engine for presenting information to the agent to guide the agent in the dialogue. The context analysis engine passes determined facts to the rules engine, which selects and asserts to the presentation engine rules based on the facts, and the presentation engine provides periodically updated guidance to the agent based on the rules asserted.

19 Claims, 3 Drawing Sheets

Related U.S. Application Data continuation of application No. 11/966,913, filed on Dec. 28, 2007, now Pat. No. 9,092,733.

(56) References Cited

U.S. PATENT DOCUMENTS

| | | |
|---|---|---|
| 6,615,172 B1 | 9/2003 | Bennett et al. |
| 6,959,080 B2 | 10/2005 | Dezonno et al. |
| 6,970,821 B1 | 11/2005 | Shambaugh et al. |
| 6,978,006 B1 | 12/2005 | Polcyn |
| 7,076,427 B2 | 7/2006 | Scarano et al. |
| 7,103,553 B2 | 9/2006 | Applebaum et al. |
| 7,191,133 B1 | 3/2007 | Pettay |
| 7,197,132 B2 | 3/2007 | Dezonno et al. |
| 7,222,075 B2 | 5/2007 | Petrushin |
| 7,243,078 B1 | 7/2007 | Lewis-Hawkins |
| 7,487,095 B2 | 2/2009 | Hill et al. |
| 7,606,714 B2 | 10/2009 | Williams et al. |
| 8,296,160 B1 | 10/2012 | Pletz et al. |
| 2002/0031212 A1 | 3/2002 | O'Neil et al. |
| 2003/0179729 A1 | 9/2003 | MacLeod Beck et al. |
| 2004/0044516 A1 | 3/2004 | Kennewick et al. |
| 2005/0177525 A1 | 8/2005 | Apple et al. |
| 2006/0095273 A1 | 5/2006 | Montvay et al. |
| 2007/0211881 A1 | 9/2007 | Parker-Stephen |

FOREIGN PATENT DOCUMENTS

| | | |
|---|---|---|
| EP | 1478155 A2 | 11/2004 |
| JP | 2004173106 A | 6/2004 |
| JP | 2005510771 A | 4/2005 |
| JP | 2006107397 A | 4/2006 |
| JP | 2006520154 A | 8/2006 |
| JP | 2007200198 A | 8/2007 |
| WO | 2004081701 A2 | 9/2004 |
| WO | 2004114207 A2 | 12/2004 |

OTHER PUBLICATIONS

Chinese Office Action with English Translation for Application No. 200880123030.4 dated Feb. 1, 2013, 13 pages.

Chinese Office action with English Translation for Patent Application No. 200880123030.4, dated Mar. 9, 2015, 7 pages.

Chinese Office action with English Translation for Patent Application No. 200880123030.4, dated Oct. 12, 2013, 11 pages.

EP Office Action for Application No. 08 866 154.1-1225, dated Jul. 27, 2012, 5 pages.

EP Office Action for Application No. 08 866 154.1-1225, dated Oct. 24, 2011, 6 pages.

EP Office Action for Application No. 08 866 154.1-1951, dated Feb. 19, 2013, 6 pages.

Examiner's Refusal Decision and Dismissal Decision of Amendments and English Translation, Japanese Patent Application No. 2010-540851, dated Apr. 15, 2013, 7 pages.

International Search Report for PCT/US2008/088097, dated May 11, 2010, 5 pages.

Japanese Office action with English Translation for Application No. 2013-168768, dated Aug. 26, 2014, 7 pages.

JP Examiner's Office Letter and English Translation for Application 2010-540851 dated Sep. 18, 2012, 6 pages.

Markku, Turunen, et al., "Agent-Based Adaptive Interaction and Dialogue Management Architecture for Speech Applications", SpringerLink Lecture Notes in Computer Science vol. 2166/2001, 2001, pp. 357-364, XP002605654, DOI 10.1007/3-540-44805-_48, ISBN: 978-3-540-42557-1, pp. 357-363.

Paul, Piwek et al., "T2D Generating Dialogues Between Virtual Agents Automatically from Text", Sep. 17, 2007, Intelligent Virtual Agents; [Lecture Notes in Computer Science], Springer Berlin Heidelberg, Berlin Heidelberg, pp. 161-174, XP019100445, ISBN: 978-3-540-74996-7, pp. 161-173.

Webb, N., "Rule-Based Dialogue Management Systems" 3rd International Workshop on Human-Computer Conversation, Bellagio, Italy, Jul. 2000, XP00260596, Retrieved from Internet: URL:http://www.nick-webb.net/Home/Publications_files/NJW_HCCOO.pdf [retrieved on Oct. 19, 2010], pp. 1-5.

Intellectual Property Office of India Examination Report for Application No. 3882/CHENP/2010, dated May 25, 2017, 7 pages.

KR Office Action and English Translation (Notice of Preliminary Rejection) for Application No. 10-2010-7016715 dated Dec. 6, 2012, 8 pages.

RECURSIVE ADAPTIVE INTERACTION MANAGEMENT SYSTEM

CROSS-REFERENCE TO RELATED APPLICATIONS

This application is a continuation of U.S. patent application Ser. No. 14/810,421, filed on Jul. 27, 2015, now U.S. Pat. No. 9,384,446, which is a continuation of U.S. patent application Ser. No. 11/966,913, filed on Dec. 28, 2007, now U.S. Pat. No. 9,092,733, the content of all of which are incorporated herein by reference.

BACKGROUND OF THE INVENTION

1. Field of the Invention

This invention is in the field of telecommunications, and pertains more particularly to electronic systems for aiding participants in electronic voice communications.

2. Description of Related Art

An important application of embodiments of the present invention is in aiding agents of an enterprise engaged in telephone communication with customers, potential customers or clients, but there are other applications as well. In the situation of enterprise agents, much such activity occurs in what have been termed in the art call centers. With increased use of Internet telephony, text communication like emails and instant messaging, and other modes of communication like chat rooms, call centers are more properly referred to by the term communication centers.

In a typical communication center a plurality of agents operate at workstations typically interconnected on a local area network (LAN) with telephone switches, servers of various sorts, and often intelligent routers that queue incoming transactions and route them to available agents, often by skill and other attributes as well as availability.

Communication centers are used by a wide variety of enterprises, such as credit card companies, banks, service organizations for manufacturers of electronic devices, and many more. In some cases communication centers are at least partially dedicated to outbound calling, for sales, political campaigns, and other purposes. In nearly all cases of agents interacting with callers and people who answer outbound calls, there is a particular purpose, such as selling a product or providing service or billing information to callers. Because of the focused purpose of nearly all such centers, agent scripting has become a common practice, and is well known in the art.

In agent scripting there is typically a scripting engine, and prompts may be provided to agents as, for example, a pop-up on a computer screen at the agent's workstation. Such instructions may also be provided by recorded audio, and scripted agent greetings are common.

Still, even though the purpose in a communication center may be common, and the callers or recipients of calls may be engaged with agents in this common purpose, there are still many variants that may take place in communications. It is not possible to know ahead of time what is in the mind of a caller, and, as is always true in interpersonal communication, there are many directions a conversation may take. In many cases, as a conversation progresses, new information is needed and new directions might prove to be profitable.

So in the present state of the art in agent/client interaction there may be a purpose, an expectation, a script and perhaps data provided, such as a customer identity and profile, and further information about the customer, collected from, for example, a customer information server. But after the interaction begins, it is often the case that the information collected may be found to be incomplete or incorrect. An agent at a financial institution, for example, may have scripted information that a caller owns a house, has a mortgage (not in arrears), and has two credit cards with substantial balances. It may happen that, during an early part of the conversation, the customer tells the agent she has sold her house, paid off her credit cards, and is interested in a line of credit in order to open up a new business in a new town. In this situation there will not be any "check boxes" on the agent's screen that can tell him what to do, and the agent may type up notes in free form to summarize the situation. The call may end gracefully, such as by the agent's saying "I understand, ma'am, and as soon as those transactions enter the system you should be able to get this taken care of" (translation: "I can't help you because my system doesn't understand this situation, and I don't have the right information.")

When dealing with human interactions, procedural, pre-designed flows are unlikely to be robust enough to deal with almost sure-to-happen variations. A person may call, for example, to discuss an advertisement they received for a line of credit loan, but they may have overdue credit card bills, have too low a score for a line of credit, but have significant home equity—and they may do their checking at another institution. It is unlikely that any business has built scripts to handle this situation, or ever would.

Given the above what is clearly needed is recursive, adaptive interactive management method and system that can "listen in" on a conversation, and can aid an agent in real time. The present invention in a variety of embodiments provides just such a system and method.

BRIEF SUMMARY OF THE INVENTION

The present inventors, having considerable experience in contact-center systems, have determined that agent-guidance systems in contact centers are woefully inadequate, and that enterprises suffer unnecessary problems and expense as a result. The inventors have therefore provided greatly enhanced functionality for such guidance systems.

In one embodiment of the present invention a management system for guiding an agent in a media-specific dialogue is provided, comprising a conversion engine for instantiating ongoing dialogue as machine-readable text, if the dialogue is in voice media, a context analysis engine for determining facts from the text, a rules engine for asserting rules based on fact input, and a presentation engine for presenting information to the agent to guide the agent in the dialogue. The context analysis engine passes determined facts to the rules engine, which selects and asserts to the presentation engine rules based on the facts, and the presentation engine provides periodically updated guidance to the agent based on the rules asserted.

In another aspect a method for guiding an agent in a media-specific dialogue is provided, comprising steps of (a) if the dialogue is voice, converting the voice to machine-readable text; (b) analyzing the text by context analysis engine and determining facts from the text; (c) passing the determined facts to a rules engine and asserting rules based on the fact input; and (d) presenting new guidance information to the agent to guide the agent in the dialogue.

DETAILED DESCRIPTION OF THE INVENTION

Figure 1:
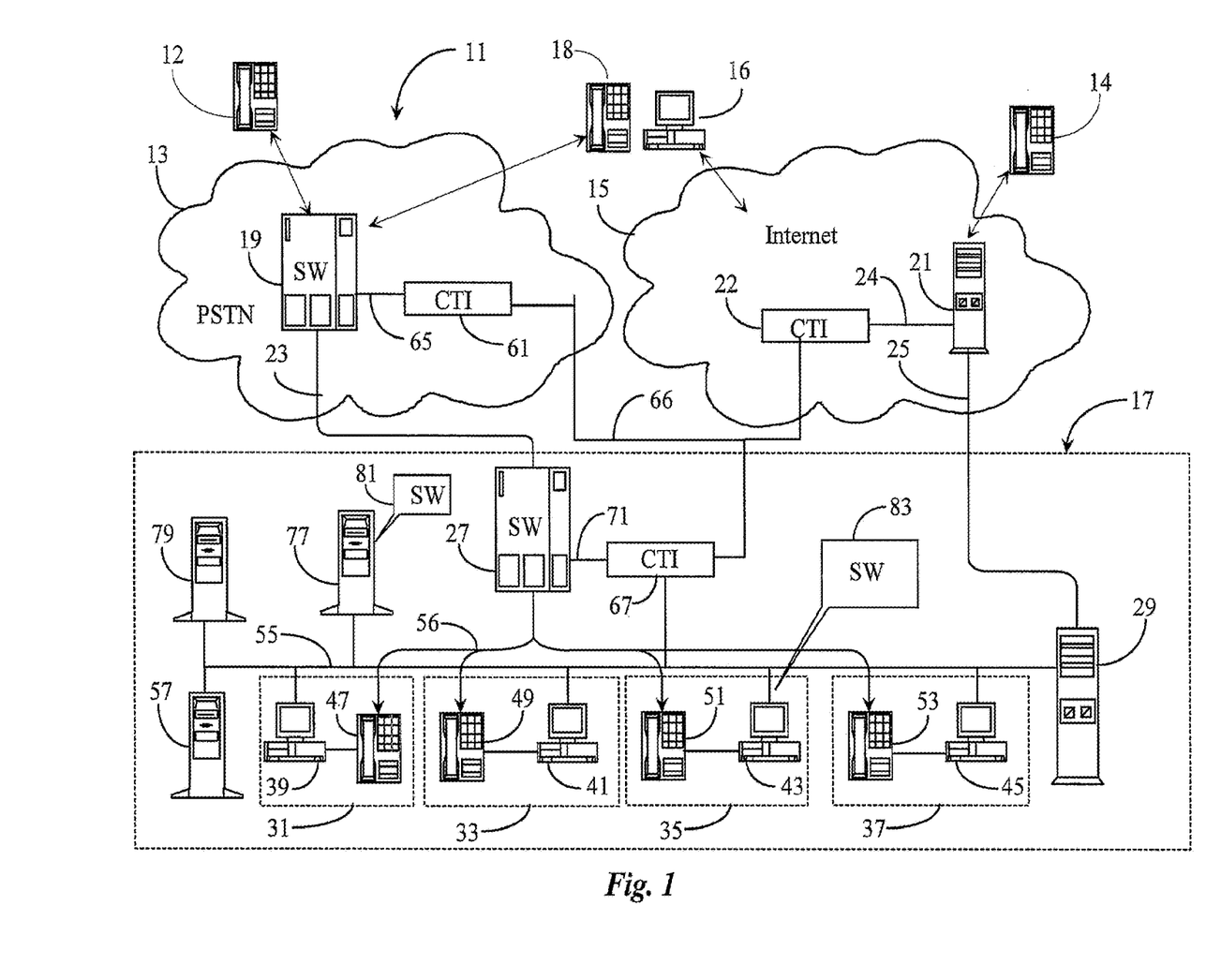
FIG. 1 is a diagram of a communication system in an embodiment of the present invention.

FIG. 1 is a diagram illustrating a communication center 17 connected through both a publicly-switched telephone network (PSTN) and an Internet-Protocol Network Telephony (IPNT) network 15 to customer phones represented by telephones 12, 14 and 18, and to customer computer stations represented by station 16. This diagram is meant to be exemplary of communication service centers in general, and their connections to networks and customer premise equipment, and not to be specifically limiting in embodiments of the invention. It is well-known that there are a wide variety of ways such communication centers may be implemented and connected, and some may provide media and services that others do not.

In exemplary center 17 agent stations are represented by stations 31, 33, 35 and 37, and each agent station is illustrated with a telephone (47, 49, 51 and 53), and a computer (39, 41, 43 and 45). These are stations where agents work in the communication center and to which calls and other transactions from customers and others may be routed and connected. The four stations illustrated are exemplary, and there may be fewer or many more agent stations. Moreover, some agents associated with the center may work at home or other sites (remote agents), and still operate as agents of the center. Further, the architecture at agent stations may vary widely as well, and there are many sorts of communication devices that might be used, and many sorts of computers executing many sorts of software.

In center 17 agent stations are shown interconnected on a local area network (LAN) 55, which is common, and several servers 57, 79 and 77 are illustrated connected to LAN 55 as well. The servers may store data and execute software for use by agents. For example, one of the servers, such as server 57, may be a statistical server (Stat Server) keeping track of transaction activity, call duration, and much other information for use by agents, other operational software associated with the center, and also by routing functions associated with the center. Another of the servers, such as server 79 may be a Customer Information Server (CIS), storing information about customers. In an embodiment of the present invention server 77 executes software that provide a recursive, adaptive interactive management and scripting service to aid agents in active interactions with customers or clients.

In FIG. 1 a telephony switch 27 is shown connected to agent stations by internal telephone lines 56, and by a trunk line 23 to a network-level switch 19 in PSTN network 13. Switch 19 receives calls from customers, and routes those that are for the communication center to switch 27 in the communication center. Switch 27 receives incoming calls from switch 19 and routes those calls to agents at agent stations. Such calls are typically queued and routed by software running as a part of a computer telephony integration (CTI) server 67, which is enabled to monitor all transactions of switch 27, and also to control switch 27.

Not all calls and other transactions serviced in center 17 will be incoming calls and transactions. In some cases a communication center such as center 17 may be dedicated to outbound calling, such as for sales or service solicitation, and in some cases outbound may be a part-time endeavor of the communication center. In many situations such outbound calling is an automated process wherein CTI server 67, or software running on another server, may be placing outbound calls, following a call list, and as calls are answered available agents are connected to the answered calls. Further there may well be many occasions wherein agents at any of the several agent stations may be manually making outbound calls.

In its routing functions CTI server 67 may access information stored and updated in other servers, such as the Stat Server 57 described above and CIS server 79 also described above, and may make routing decisions based on many factors, such as load, caller ID, agent skill, and much more.

In this particular center an IPNT server 29 is illustrated as connected to LAN 55 and to a server 21 in Internet 15, also connected to a CTI server 22 by connection 24. Another CTI server 61 connects to switch 19 in the PSTN by connection 65, and the CTI servers are interconnected by link 66. The CTI servers may thus communicate on lines separate from the communication lines, to coordinate activities of the switches and nodes to which they are connected.

Switch 19 in the PSTN in this example receives calls from customers, the calls represented as coming from telephone 12, which is meant to be representative of many PSTN capable devices that customers might use. In some cases such calls may originate in different networks in different protocols, and may finally arrive at switch 19, to be routed on to switch 27 in the call center.

Incoming IPNT calls are received by server 21 in the Internet network, from callers and devices represented by telephone 14, which is meant to represent all sorts of devices that may originate IPNT calls. Such calls may originate at widely variant sources in different formats, and may be converted and routed in different ways before reaching server 21. At server 21 such calls are routed on to server 29 in the communication center, where they may be further routed on LAN 55 to agent stations. The agent stations may handle these calls using software executing on station computers, or by other devices (smart telephones and the like). The telephones and computer indications at agent stations are meant to represent all of these sorts of devices that might be used. Server 29 has access to Stat Server 57 as well, and may execute the same or similar software for queuing and routing transactions that may be used by CTI server 67 in routing PSTN calls. In another embodiment there may be a CTI server connected and operable with server 29 as well, and in another an integrated switch and server may handle and route both IPNT and PSTN calls.

Other sorts of transactions than IPNT calls may be sent to communication center 17 by customers in this example, and also be sent by agents to customers and others outside the communication enter, such as emails, text messages, chat sessions, and more. Computer 16 is meant to represent all sorts of electronic appliances that may connect to Internet 15 in all sorts of ways, and may originate such transactions, which may be then routed on by server 29, and by LAN 55 to agents at agent stations. Another telephone 18 is illustrated proximate computer 16, and is meant to indicate, along with computer 16, an arrangement common to many, if not most homes and offices at the time of filing the present application, wherein a user has both a telephone (18) connected to the PSTN and a computer of other electronic appliance, connected to Internet 15, and enabled to access web pages in the World Wide Web (WWW), as well as to use many other services available on the Internet.

Scripting is a well-known technology in communication centers, and in the present example scripting is taken to a new level that the inventors term interaction management. Referring to FIG. 1 again, server 77 executes software 81 interacting with software 83 shown operating on computer 43 in agent station 35. The interaction of server 77 and computer 43 in station 35 is exemplary, and the same sort of interaction may be taking place between server 77 and many other agent stations in the center. Software 81 provides an interaction management system in various embodiments of the invention.

A function of scripting systems is to provide scripts that an agent may follow in interacting with a client. In a sales campaign, for example, the system may provide a script as a pop-up window for an agent that the agent may read to make a sales pitch to a potential customer. Typically there may also be mechanisms for an agent to access data in, for example, Stat Server 57 and CIS 79 during interaction with a caller or a person who answers an outbound call.

Figure 2:
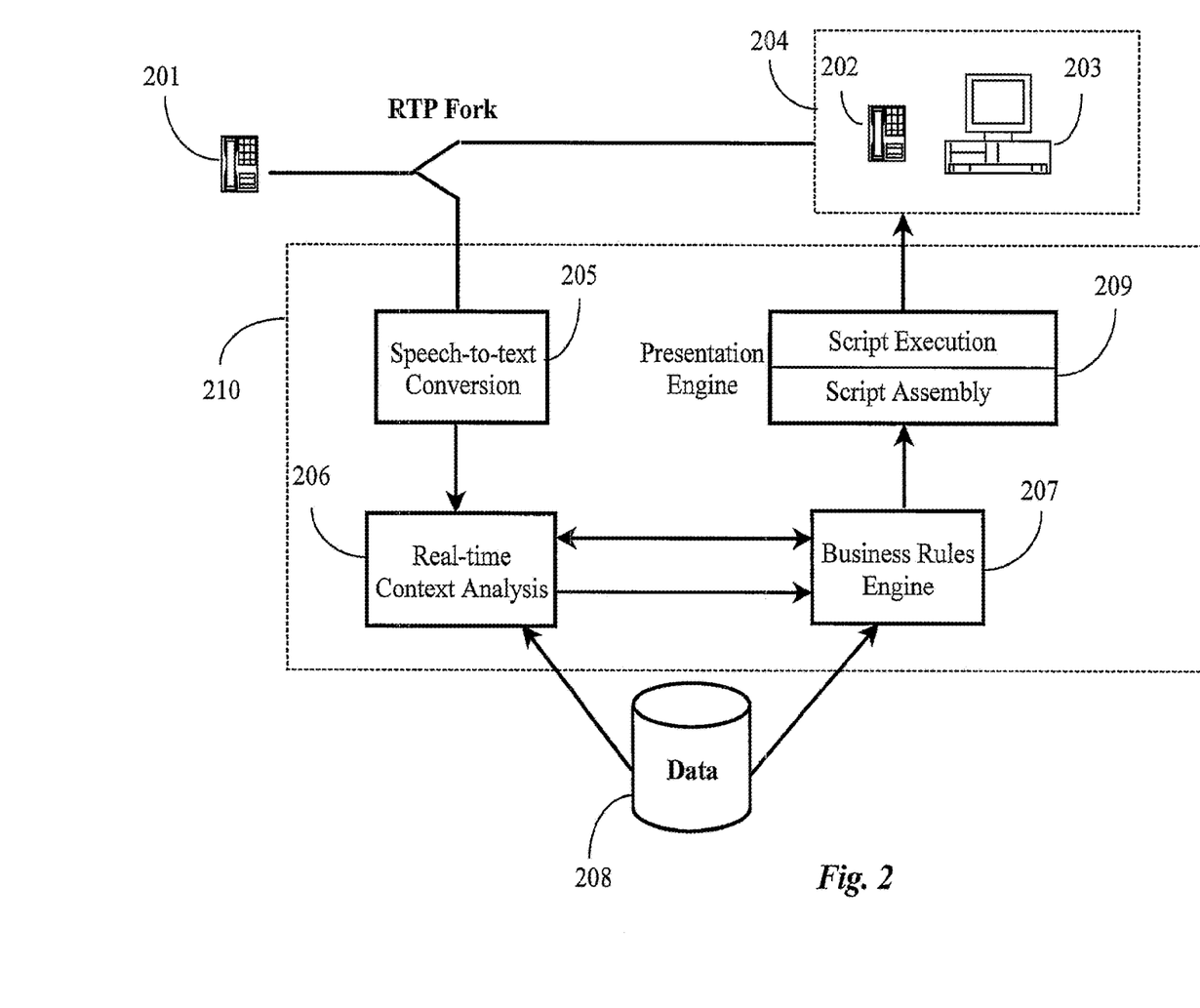
FIG. 2 is a diagram illustrating functions of software interacting with an agent and an active transaction.

In embodiments of the present invention the interaction management system provides more than preprogrammed scripts to an agent during an interaction, such as a live telephone call. FIG. 2 is a diagram illustrating functions of software 81 described above relative to server 77 interacting with SW 83 at an agent station, providing interaction management system 210. In FIG. 2 a caller using a telephone 201 has called the communication center, and has been connected to an agent at agent station 204. A conversation ensues. The agent at station 204 has a telephone 202 and a computer 203. The interaction management system in an embodiment of the invention "listens in" to the communication, in this example, which assumes the call is an IPNT call, that is, comprising data packets, through an RTP fork shown. RTP is well-known in the art, and denotes a packetized data stream. The RTP fork is a software application that connects to an RTP stream, duplicates packets, and sends packets on to two different endpoints. In the case of FIG. 2 the end points are a speech-to-text conversion function 205, which is a part of the interactive management system, and the agent station 204.

In the example of FIG. 2, as noted above, the active transaction is an IPNT voice transaction. For calls through the PSTN, which the inventors term COST calls, for connection-oriented switched telephony, a conference bridge or other forking mechanism in switch 27 might be used so the interaction management system of the invention can "listen in". The system has a bit different architecture as well for text transactions, such as instant messaging exchanges. In such cases element 205 is not necessary, as the dialogue is already in text form.

In the case of voice transactions, speech-to-text conversion function 205 creates machine-readable text from the audio using a speech-engine, and real-time context analysis is done at function 206. The system understands the context of the conversation and offers that context to business rules engine 207 to determine next steps.

The context analysis may in some cases be quite simple. For example, the context analysis function may monitor the conversation for key sentences or phrases, and the rules engine may determine a next step based on discovery of a key sentence or phrase. In another aspect the context analysis might listen for a question, and then, perhaps depending on whether the question is from the agent or the customer, normalize the answer, and use the answer to determine a next step through rules engine 207.

Once a next step is determined presentation engine 209 provides necessary input to the agent, which may happen in a number of different ways, such as by audio or screen pops, or by changing text in sidebars and the like. In one embodiment the presentation engine comprises both a script assembly engine and a script execution engine. In this case the script assembly engine is directed by the rules engine, and has access to a range of elements for scripts. Based on the current input, the script assembly engine composes a script to be executed. The elements for the script may be influenced by a number of inputs, such as preferences of the agent, historical data concerning the agent or the customer, or both, real-time status in the contact center, such as load status, and, of course, any new direction determined by the context analysis of the ongoing dialogue. Once the script is assembled, the script execution engine carries out the task of presenting the script to the agent.

An important characteristic of the interaction management system is determining real-time analytics for communications, and using the information to assist the agent with an ongoing communication.

The example described relative to FIG. 2 comprises following a voice communication, but the same may be done with text-based communications like instant messaging (IM) and chat, and speech-to-text conversion is not needed. In the case of voice the interaction management system "listens" to the conversation going on and in real-time is able to understand what is being discussed, even if one of the participants is an automatic system. An important purpose of listening to the conversation is to understand what is said (transcript) and to understand the subject matter in fine detail (context). Based on the information captured and analyzed, and on defined business rules, the operator is presented with relevant information so he/she can inform the other party better, or may achieve sales goals or other goals in another context.

In some cases information is presented, such as new information about the customer, which may have been determined, for example, using something the customer said as a clue, and in some cases the operator is presented with suggested dialog. The system thus provides a dynamic script which changes according to the direction and variance of the real-time conversation. The script can include suggested responses, but also indicate and encourage up-sell and cross-sell opportunities. Suggested responses may also be based on business rules not associated with analysis of the real-time conversation. For example, if the customer had to wait more than 5 minutes in the queue, no up or cross sell opportunities are suggested unless the customer thanks the agent more than twice.

The presentation of scripts and information to an agent may also be specific to the agent involved in the dialogue. For example, if analysis shows that, historically, this particular agent nearly always responds to queues that are floated up on the lower right hand side of the screen, but seldom notices prompts that are added as tabs that can be selected, then for this agent a "pop-up toast" method might be used (wherein a notification "floats" up on the lower right part of the screen); for some other agents a new tab may be added, because it is known that the specific agent prefers, and works with, a clean interface with optional "drill down" tabs available. Also in some embodiments, facility is made available for an agent to personalize the way in which information is presented by the scripting, or presentation engine. In that case, the same agent may prefer at different times, or under different circumstances to have the information presented in a different way.

In the situation where the dialogue analysis, along with other available information, indicates such as an up-sell or cross-sell opportunity, the presentation engine may provide an icon, for example next to a suggestions, with meanings understood by the agent, such as Mandatory, Important, "Big Opportunity", "Oh by the Way" and the like. In some embodiments the agents may be enabled to tag prompts with feedback such as "Customer not eligible", "Customer hates this idea", "Whose idea was this anyway?", "Great idea", "Tried it but it didn't work, but send it to me again", "Nice idea, wrong customer", "I need to understand this one more before you send it to me again". These are suggestive examples. In this embodiment, when an agent takes any action, for example by adding a feedback (perhaps by right-clicking and selecting from a drop-down menu that includes a "Custom Feedback" option), this event (or action) is asserted to the Rules Engine, where it may then trigger rules such as "Schedule this agent for training on umbrella policies", "Update this customer's record", "This offer was not good, check for a better one", and so forth.

In some cases, such as in the example immediately above, the rules that are triggered may direct the Script Assembly Engine to add or take away something from the script. This may be a lot like when one is using a road navigation system with GPS. When it says "turn right here" and you keep going, it doesn't say "no, stupid, turn around and do what I told you"; rather, it recalculates a new set of directions and says "OK, turn right in 1 mile!". Similarly, the Script Assembly Engine, on receiving notifications from the rules engine, can assemble a new "from here forward" script and send it to the Script Execution Engine. The SEE executes local rules about how to display scripting prompts to the agent. In some cases, perhaps depending on the agent, or the nature of a sales campaign, for example, the prompts may be hard prompts, given in such a way that the agent knows she is expected to follow the prompt closely, or soft prompts. Soft prompts (soft scripting) refers to an idea that the agent gets suggestions and queues, but is not necessarily rigorously tied to saying particular phrases in a particular order.

In some embodiments prompts and flags may be provided by the scripting engine, prompted by the rules engine, indication relatively general situational analysis. For example, a series of dialogue may indicate a rising level of customer frustration. If a "customer frustration" flag is set, this might have been done by the Rules Engine in response to data received from various sources (for example, the media application server may send a notification that the customer said "I already told you" twice in the last minute). This rule may also cause the Script Assembly Engine to reassemble a new "going forward" script that involves automatically popping up a dialog box on a supervisor desktop prompting the supervisor to listen if possible, and also a change in the soft scripting being sent to the agent that is tailored to the new situation.

In some embodiments of the invention the change or response may not be immediate. In some cases the interaction management system may operate in a backend process that considers information that becomes available in real-time, but takes more time to analyze and process. For example, on initiation of an automatic service, a backend (batch!) business process might be instantiated that does a calculation of the consumer's credit score and eligibility for a special program or offer. While this is processing, the voice application would proceed as if this had never been done (that is, the Script Assembly Engine would have assembled a script based on what was known at the time). When the back end system comes back, perhaps much later, with a very positive result, the Script Assembly Engine would be notified by the Rules Engine and would, taking into account what has already happened during the interaction, assemble a totally new "going forward" script and deliver it to the Script Execution Engine (which in this case would cause execution to occur in the Media Server).

An important characteristic in some more robust embodiments of the present invention is recursion. A recursive process is a process that acts back on itself. In embodiments of the present invention, recursion refers to the fact that the Script Assembly Engine assembles a first script for a new interaction and then, based on actions taken and events received during the execution of the first script it regenerates the script and sends a revised, or second, script to the Script Execution Engine. Thus the Script Execution Engine executes scripts that are generated by the Script Assembly Engine, and these scripts may change based on actions taken during their execution. Thus the system overall is recursive—it acts back on itself even as it is operating. More specifically, in conventional scripting systems used in contact centers and similar business environments at the time of the present application, the "agents" or workers carry out the orders of the scripting system. There may be conditional branches that depend on input from the agent, but the underlying script does not change. The branches are designed in, preprogrammed before the script is executed, and then the script operates in a procedural way using if-then-else constructs.

In the recursive system in embodiments of the present invention, the agent is considered an essential, intelligent actor of the highest importance, just as the customer is. The agent will in general know more, be more attentive to nuance, and be more able to make common sense decisions than even the best scripting engine. Thus the agent may take an action not anticipated by the scripting engine (or indeed the customer might, or might force the agent to, take a completely different tack). In a recursive system, the spontaneous and unscripted actions of agents and customers act back on the scripting engine and may cause it to redesign the script on the fly, sending the updated script to the Script Execution Engine.

Another important aspect in robust embodiments of the invention is that the system is adaptive. That is, it adapts to signals from its environment. This refers to the fact that the Script Assembly Engine may need to react to events such as changes in statistical performance. For example, if the service level drops below a threshold, or the number of calls in queue exceeds a threshold, or an inbound upsell campaign is succeeding significantly more than expected and requires increased emphasis.

In a highly recursive and adaptive system, as in robust embodiments of the present invention, the notion of procedural programming, typified in that procedural programs can be flowcharted—do this, then this, then perform this if-then-else block, then get this data, then do this other thing, etc.—breaks down. This is because, when dealing with human interactions, procedural, pre-designed flows are unlikely to be robust enough to deal with the variations. A person may call to discuss an advertisement they received for a line of credit loan, but they may have overdue credit card bills, have too low a score for a line of credit, but have significant home equity—and they may do their checking at another institution. It is unlikely that any enterprise has built preprogrammed scripts to handle such a situation, or ever would.

In embodiments of the invention, as inputs (events) are received variously by the media server, which is playing a VoiceXML application sent to it by the Script Execution Engine, which in one embodiment is a VoiceXML application server, the agent desktop application (sent through the Script Execution Engine) and the Statistics Server, they are sent to the Rules Engine. In rules engine language, "sending an event" to the engine results in the "assertion of a fact". When facts are asserted in a rules engine, they are added to the fact situation, and the engine checks to see if any rules are triggered by the addition of the new fact. In this case, as facts are asserted, the Rules Engine considers each in turn. Depending on how the rules are written, at some point a rule which might be thought of as a "drop current offer" rule is fired, which tells the Script Assembly Engine to build a new script which takes this into account. Again, in response to inputs from the various sensing elements of the system, the Rules Engine might fire several rules simultaneously, in effect telling the SAE to "conduct address change, check credit card records to verify payment, override and make eligible for line of credit, and conference in a Business Sales Associate to help client open a business account". The SAE would then assemble a new script, starting from "where the interaction is now" to gracefully accomplish all of these, but leaving considerable leeway (how much is another configurable option) to the agent in exactly how to do these things. The SAE assembles a new script and sends it to the SEE (Script Execution Engine), which then executes it by sending various signals to the agent according to its rules on how to ergonomically assist the agent.

Figure 3:
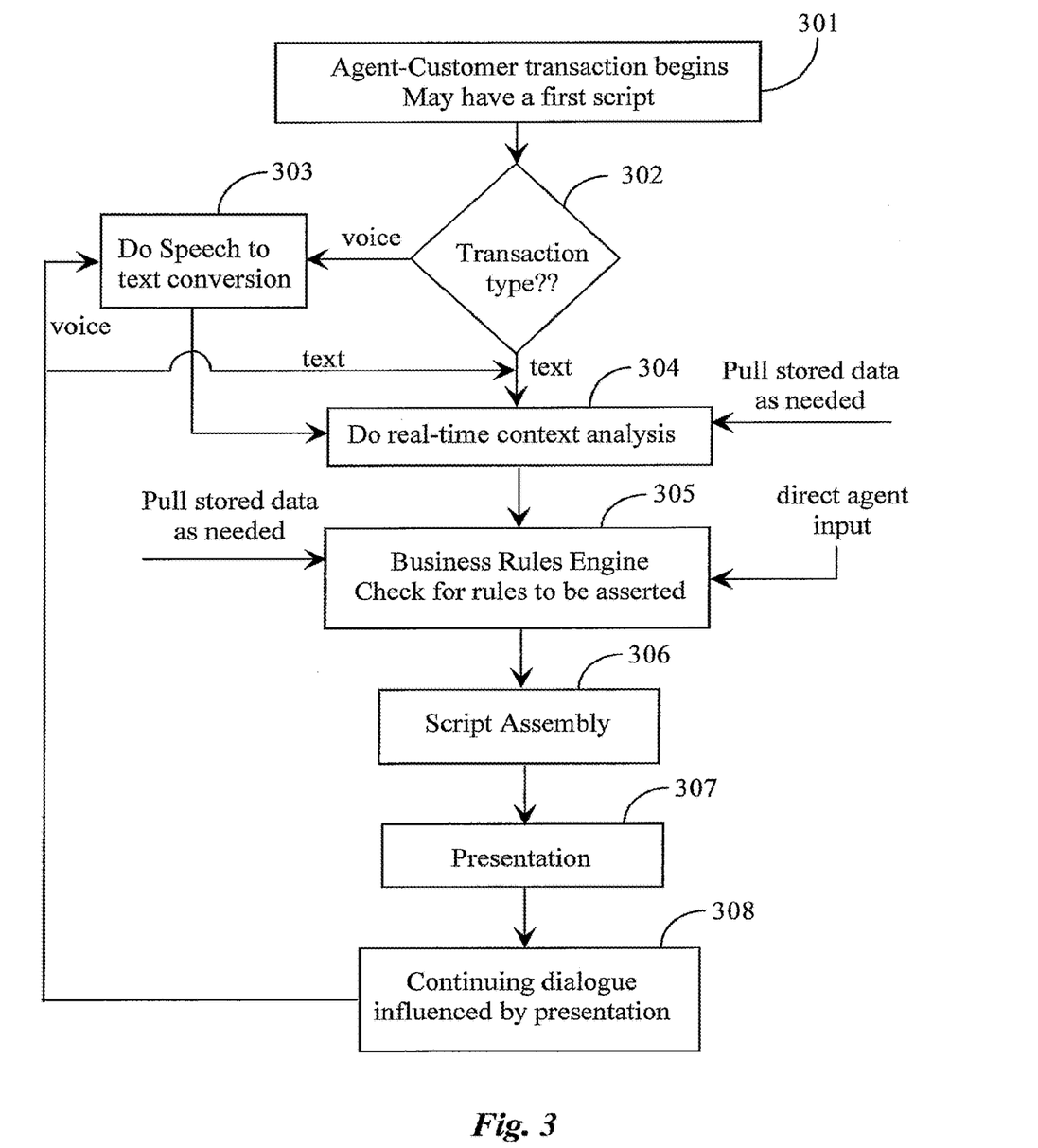
FIG. 3 is a process flow chart illustrating steps in a method according to an embodiment of the present invention.

FIG. 3 is a process flow chart illustrating steps in a method according to an embodiment of the present invention. An agent/Customer transaction begins at step 301. This may be a result of a customer call routed to the agent, or of a customer answering an outbound call, which is then routed to the agent. There may be a first script, of a relatively general nature, based upon the know context of the contact center or a campaign, for example.

At step 302 the system determines if the transaction is voice or text. There may be further decision at this point depending on whether the voice is a COST or an IPNT call, or if text, whether the transaction is a chat or an IM, for example. If voice, at step 303 speech-to-text conversion is accomplished. It must be understood that the conversion is an ongoing process as the transaction unfolds. If the transaction is text no such conversion is needed. In either case, once the transaction is rendered as text, if not already text, the text goes to step 304, where real-time context analysis is accomplished. This analysis is a robust process comprising a software suite that "looks at" sentences and phrases, does normalization, and assigns meaning from perhaps a repository of meaning available to the context engine. The goal is for the system to understand the dialogue and to draw inferences from the understanding of the dialogue. Analysis may comprise much more than meanings of words and phrases. Such as, for example, the average length of phrases as dialogue continues. A person getting angry often speaks in shorter phrases. Volume and inflection may have assigned meaning as well.

Once context is established and meaning is inferred, the facts determined go to a business rules engine at step 305. The facts are considered and rules may be applied as a result. The rules cause input to script assembly engine 306, which selects components for a new script, and presentation engine presents the new or altered or updated script to the agent station through the agent's desktop application, or compatible software cooperating with the desktop application.

The new script presentation or other prompts as a result of the ongoing analysis has certain effect on the ongoing dialogue, indicated at step 308. The continuing dialogue continues to be analyzed at step 304, and the recursive cycle continues with further updated prompts and scripts until the dialogue is discontinued for whatever reason.

Adaptive features allow for direct agent input and tuning, so an agent can personalize the system for her own use, and may also correct the system if the system makes an incorrect inference (gets a wrong idea).

The skilled artisan will understand that there are many alterations and additions that might be made in embodiments described without departing from the spirit and scope of the invention. For example, the system may add new knowledge gained from ongoing and repeated transaction monitoring. Statistical analysis may be done periodically, both from the standpoint of the overall system, and on an agent specific basis. Results may be used for agent training, and for further development of experienced agents. There is a rich variety of ways that feedback to the agent may be accomplished, using all sorts of media, and the agent may have configuration ability to tune the system Many such changes may be made. The invention is limited only by the scope of the claims that follow.

We claim:

1. A computer-based management system for guiding a human agent during an interaction with a customer of a contact center, comprising:
   a processor; and
   a memory, wherein the memory has computer instructions stored therein that, when executed by the processor, cause the processor to:
      assemble a first script having first and second components;
      display the first and second components of the first script on an agent display device during the interaction for guiding the human agent on suggested dialogue or other actions to be taken during the interaction between the agent and the customer;
      monitor the interaction between the human agent and the customer for context analysis and generate context analysis output in response;
      monitor real-time statistics of the contact center, wherein the real-time statistics indicate decrease of the contact center performance;
      determine that the agent has taken an action not anticipated by the first script based on the context analysis output;
      in response to the determining, dynamically assemble, during the interaction between the human agent and the customer, a second script having third and fourth components, wherein the second script is based on the monitored real-time statistics of the contact center, and is for increasing the contact center performance; and
      update the agent display device to display the third and fourth components instead of the first and second components.

2. The system of claim 1, wherein the second script is dynamically assembled based on the action not anticipated by the first script.

3. The system of claim 1, wherein the instructions further cause the processor to:
   update the context analysis output based on the action; and
   identify a rule based on the updated context analysis output, wherein the second script is dynamically assembled based on the rule.

4. The system of claim 1, wherein updating the agent display device to display the third and fourth components of the second script comprises removing the first script from the agent display device.

5. The system of claim 1, wherein the interaction is a voice dialog, and the instructions further cause the processor to:
   convert the voice dialog to machine-readable text, wherein the context analysis is based on the machine-readable text.

6. The system of claim 1, wherein the context analysis is based on analysis of additional data other than text of communication exchanged between the agent and the customer during the interaction.

7. The system of claim 6, wherein the additional data includes one or more of volume of speech, vocal inflection, sentence structure, or rate of dialogue.

8. The system of claim 1, wherein the other actions are actions other than a response to the customer, to be taken during the interaction between the human agent and the customer.

9. The system of claim 1, wherein the second script includes prompts that are annotated with indicia indicating characteristics of the prompts.

10. The system of claim 1, wherein the action not anticipated by the first script includes a change of topic of the interaction between the human agent and the customer.

11. A method of guiding a human agent during an interaction with a customer of a contact center, comprising:
   assembling, by a processor, a first script having first and second components;
   displaying, by the processor, the first and second components of the first script on an agent display device during the interaction for guiding the human agent on suggested dialogue or other actions to be taken during the interaction between the agent and the customer;
   monitoring, by the processor, the interaction between the human agent and the customer for context analysis and generate context analysis output in response;
   monitoring, by the processor, real-time statistics of the contact center, wherein the real-time statistics indicate decrease of the contact center performance;
   determining, by the processor, that the agent has taken an action not anticipated by the first script based on the context analysis output;
   in response to the determining, dynamically assembling, by the processor, during the interaction between the human agent and the customer, a second script having third and fourth components, wherein the second script is based on the monitored real-time statistics of the contact center, and is for increasing the contact center performance; and
   updating, by the processor, the agent display device to display the third and fourth components instead of the first and second components.

12. The method of claim 11, wherein the second script is dynamically assembled based on the action not anticipated by the first script.

13. The method of claim 11, further comprising:
   updating, by the processor, the context analysis output based on the action; and
   identifying, by the processor, a rule based on the updated context analysis output, wherein the second script is dynamically assembled based on the rule.

14. The method of claim 11, wherein updating the agent display device to display the third and fourth components of the second script comprises removing the first script from the agent display device.

15. The method of claim 11, wherein the interaction is a voice dialog, the method further comprising:
   converting, by the processor, the voice dialog to machine-readable text, wherein the context analysis is based on the machine-readable text.

16. The method of claim 11, wherein the context analysis is based on analysis of additional data other than text of communication exchanged between the agent and the customer during the interaction.

17. The method of claim 16, wherein the additional data includes one or more of volume of speech, vocal inflection, sentence structure, or rate of dialogue.

18. The method of claim 11, wherein the other actions are actions other than a response to the customer, to be taken during the interaction between the human agent and the customer.

19. The method of claim 11, wherein the second script includes prompts that are annotated with indicia indicating characteristics of the prompts.

* * * * *